(12) United States Patent
Kirchmair

(10) Patent No.: US 10,800,257 B2
(45) Date of Patent: Oct. 13, 2020

(54) TRACKED VEHICLE AND CONTROL METHOD OF THE SAME

(71) Applicant: Prinoth S.p.A., Vipiteno (IT)

(72) Inventor: Martin Kirchmair, Pfons (AT)

(73) Assignee: Prinoth S.p.A., Vipiteno (IT)

( * ) Notice: Subject to any disclaimer, the term of this patent is extended or adjusted under 35 U.S.C. 154(b) by 141 days.

(21) Appl. No.: 16/073,969

(22) PCT Filed: Feb. 6, 2017

(86) PCT No.: PCT/IB2017/050628
§ 371 (c)(1),
(2) Date: Jul. 30, 2018

(87) PCT Pub. No.: WO2017/134636
PCT Pub. Date: Aug. 10, 2017

(65) Prior Publication Data
US 2019/0054823 A1    Feb. 21, 2019

(30) Foreign Application Priority Data

Feb. 5, 2016   (IT) .................... 102016000012333

(51) Int. Cl.
*B60K 28/06* (2006.01)
*B60T 7/14* (2006.01)
(Continued)

(52) U.S. Cl.
CPC ............... *B60K 28/06* (2013.01); *B60T 7/14* (2013.01); *B62D 55/065* (2013.01); *E02F 3/961* (2013.01); *E02F 9/2016* (2013.01); *E02F 9/2079* (2013.01)

(58) Field of Classification Search
CPC .. B60K 28/06; B60K 28/02; B60K 2028/006; B62D 55/065; B62D 55/06; E02F 9/2079;
(Continued)

(56) References Cited

U.S. PATENT DOCUMENTS 4,017,843 A    4/1977  Yanagishima
6,092,013 A *  7/2000  Stelzle ............... A01B 63/1117
                                                      180/53.6

(Continued)

FOREIGN PATENT DOCUMENTS

GB       2 356 959 A      6/2001
WO    WO 2013/021169 A2   2/2013

OTHER PUBLICATIONS

Notification Concerning Submission, Obtention or Transmittal of Priority Document for International Application No. PCT/IB2017/050628 dated Apr. 21, 2017.

(Continued)

*Primary Examiner* — Timothy Wilhelm
(74) *Attorney, Agent, or Firm* — Neal, Gerber & Eisenberg LLP

(57) ABSTRACT

A tracked vehicle comprising: a first and a second track; a generator assembly configured to generate mechanical power; a group of work devices coupled to the generator assembly; a first and a second drive wheel coupled to the first and to the second track, respectively, and to the generator assembly; a user interface configured to receive commands from an operator; and a control unit connected to the user interface to receive commands from the operator; the control unit being configured to: measure an amount of time elapsed between a command sent by the operator and a subsequent command sent by the operator; and set the tracked vehicle to a blocked state if the amount of time measured is greater than a first time interval threshold.

13 Claims, 3 Drawing Sheets

(51) Int. Cl.
  *B62D 55/065* (2006.01)
  *E02F 3/96* (2006.01)
  *E02F 9/20* (2006.01)

(58) Field of Classification Search
  CPC ....... E02F 9/2016; E02F 3/961; E02F 9/2062; E02F 9/2075; B60T 7/14; B60W 2540/26; B60L 3/02; A01B 76/00; B60R 2021/0076; B60R 2021/0081
  See application file for complete search history.

(56) References Cited

U.S. PATENT DOCUMENTS

| | | | | |
|---|---|---|---|---|
| 6,131,062 A | * | 10/2000 | Nielsen | H04L 29/06 |
| | | | | 172/2 |
| 6,371,255 B1 | * | 4/2002 | LeBegue | B60T 1/062 |
| | | | | 188/170 |
| 7,349,794 B2 | * | 3/2008 | Malone | F02D 41/22 |
| | | | | 123/479 |
| 7,750,497 B2 | * | 7/2010 | Hashimoto | H02J 1/14 |
| | | | | 307/10.1 |
| 7,950,481 B2 | * | 5/2011 | Betz | B60K 6/46 |
| | | | | 180/65.31 |
| 8,577,575 B2 | * | 11/2013 | Tomura | B60W 50/029 |
| | | | | 701/70 |
| 10,132,259 B1 | * | 11/2018 | Watson | F02D 41/065 |
| 2009/0058624 A1 | | 3/2009 | Kane et al. | |
| 2017/0102712 A1 | * | 4/2017 | Nijam | A01B 76/00 |

OTHER PUBLICATIONS

Notification of Transmittal of the International Search Report and the Written Opinion for International Application No. PCT/IB2017/050628 dated May 8, 2017.

* cited by examiner

TRACKED VEHICLE AND CONTROL METHOD OF THE SAME

PRIORITY CLAIM

This application is a national stage application of PCT/IB2017/050628, filed on Feb. 6, 2017, which claims the benefit of and priority to Italian Patent Application No. 102016000012333, filed on Feb. 5, 2016, the entire contents of which are each incorporated by reference herein.

TECHNICAL FIELD

The present disclosure relates to a tracked vehicle, for example for grooming ski runs, and a method for controlling the tracked vehicle.

In particular, the present disclosure relates to a tracked vehicle comprising: a first and a second track; a generator assembly configured to generate mechanical power; a group of work devices coupled to the generator assembly; a first and a second drive wheel coupled to the first and to the second track, respectively, and to the generator assembly; a user interface configured to receive commands from an operator; and a control unit configured to control the generator assembly, the first and second drive wheels, and the work devices.

The first drive wheel, the second drive wheel and the group of work devices define a power-consumption group.

BACKGROUND

Tracked vehicles are maneuvered by an operator, who, by operating the user interface, controls the direction, forward/reverse movement and speed of the vehicle, and controls the work devices. The user interface may comprise one or more components from the following list: a pedal, for example an accelerator pedal; a control lever; one or more buttons; a joystick; and a steering wheel.

One drawback of certain of known tracked vehicles is that, in some circumstances, the operator might be unable to drive the tracked vehicle in an appropriate manner. For example, the operator might be taken ill while using the tracked vehicle and lose control of the tracked vehicle, causing substantial injury to the operator and persons in the vicinity, and damage to surrounding property and the vehicle itself. Another event that might occur is that the operator operates the tracked vehicle without being able to control the tracked vehicle properly, for example, because of continual driving distractions, or because of not being correctly seated in the driving seat, or because the controls are left after setting the tracked vehicle in operation.

SUMMARY

One feature of the present disclosure is to provide a tracked vehicle that reduces certain of the drawbacks of certain of the known art.

According to the present disclosure, a tracked vehicle is provided that comprises: a first and a second track; a generator assembly configured to generate mechanical power; a group of work devices coupled to the generator assembly; a first and a second drive wheel coupled to the first and to the second track, respectively, and to the generator assembly; a user interface configured to receive commands from an operator; and a control unit connected to the user interface to receive commands from the operator; the control unit being configured to: measure an amount of time elapsed between a command sent by the operator and a subsequent command sent by the operator; and set the tracked vehicle to a blocked state if the amount of time measured is greater than a first time interval threshold.

It should thus be appreciated that in accordance with the present disclosure, movement of the tracked vehicle is halted and the work devices are stopped if the control unit detects that a time greater than the first time interval threshold has elapsed since the last command C received from the operator. That is, in certain circumstances in which the operator might no longer be able to control the tracked vehicle (for example, due to loss of consciousness, suddenly falling asleep, or some other event in which the operator is unable to drive the tracked vehicle properly, for example, by being subjected to driving distractions or voluntarily leaving the controls) as detected by a time greater than the first time interval threshold has elapsed since the last command C received from the operator, the movement of the tracked vehicle is halted and the work devices are stopped.

In one embodiment of the present disclosure, the tracked vehicle comprises a power transmission that couples the generator assembly to the drive wheels and to the work devices.

According to one embodiment of the present disclosure, the control unit stops the movement of the first and second tracks when the tracked vehicle is in a blocked state. In one such embodiment, the movement of the tracks is stopped in a gradual manner and, in particular, the speed of the tracked vehicle drops according to a descending ramp.

According to another embodiment of the present disclosure, the control unit stops the movement of the work devices when the tracked vehicle is in a blocked state.

According to another embodiment of the present disclosure, the tracked vehicle comprises a display element connected to the control unit to send a visual message to the operator, the control unit sending the visual message to the operator if the amount of time measured is greater than a second time interval threshold, the second time interval threshold being lower than the first time interval threshold.

According to another embodiment of the present disclosure, the tracked vehicle comprises an acoustic element connected to the control unit to send an acoustic message to the operator, the control unit sending the acoustic message to the operator if the amount of time measured is greater than a second time interval threshold, the second time interval threshold being lower than the first time interval threshold.

According to another embodiment of the present disclosure, the tracked vehicle comprises a confirmation command unit that can be operated by the operator and configured to send a command to the control unit so as to reset the amount of time measured.

According to another embodiment of the present disclosure, the first time interval threshold is determined based on the speed of the tracked vehicle.

According to another embodiment of the present disclosure, the control unit comprise a counter that measures the amount of time elapsed between the command sent by the operator and the subsequent command sent by the operator.

According to another embodiment of the present disclosure, the tracked vehicle comprises a further display element and/or a further acoustic element connected to the control unit to send a further message to persons in the vicinity of the tracked vehicle, the control unit sending the further visual and/or acoustic message to the persons in the vicinity if the amount of time measured is greater than the first time interval threshold.

Another feature of the present disclosure is to provide a method of controlling a tracked vehicle that reduces certain of the drawbacks of certain know tracked vehicles.

According to the present disclosure, a control method for a tracked vehicle is provided, the tracked vehicle comprising: a first and a second track; a generator assembly configured to generate mechanical power; a group of work devices coupled to the generator assembly; a first and a second drive wheel coupled to the first and second tracks, respectively, and to the generator assembly; and a user interface configured to receive commands from an operator; the method comprising the steps of: measuring an amount of time elapsed between a command sent by the operator and a subsequent command sent by the operator; and setting the tracked vehicle to a blocked state if the amount of time measured is greater than a first time interval threshold.

According to one embodiment, the step of setting the tracked vehicle to a blocked state comprises stopping the movement of the first and the second tracks. In one such embodiment, stopping the movement of the tracks in a gradual manner, in particular by reducing the speed of the vehicle according to a descending ramp.

According to another embodiment, the step of setting the tracked vehicle to a blocked state comprises stopping the movement of the work devices.

According to another embodiment, the method comprises the step of sending a visual message to the operator before setting the tracked vehicle to a blocked state.

According to another embodiment, the method comprises the step of sending an acoustic message to the operator before setting the tracked vehicle to a blocked state.

According to another embodiment, the method comprises the step of resetting the amount of time measured if the operator sends a reset command.

According to another embodiment, the method comprises the step of defining the first time interval threshold on the basis of the speed of the tracked vehicle.

According to another embodiment, the method comprises the step of sending a further visual and/or acoustic message to persons in the vicinity of the tracked vehicle when the tracked vehicle is in a blocked state.

Additional features and advantages are described in, and will be apparent from the following Detailed Description and the figures.

BRIEF DESCRIPTION OF THE DRAWINGS

Other characteristics and advantages of the present disclosure will become clear from the description that follows of a non-limitative embodiment provided by way of example, with reference to the accompanying drawings, in which.

DETAILED DESCRIPTION

Figure 1:
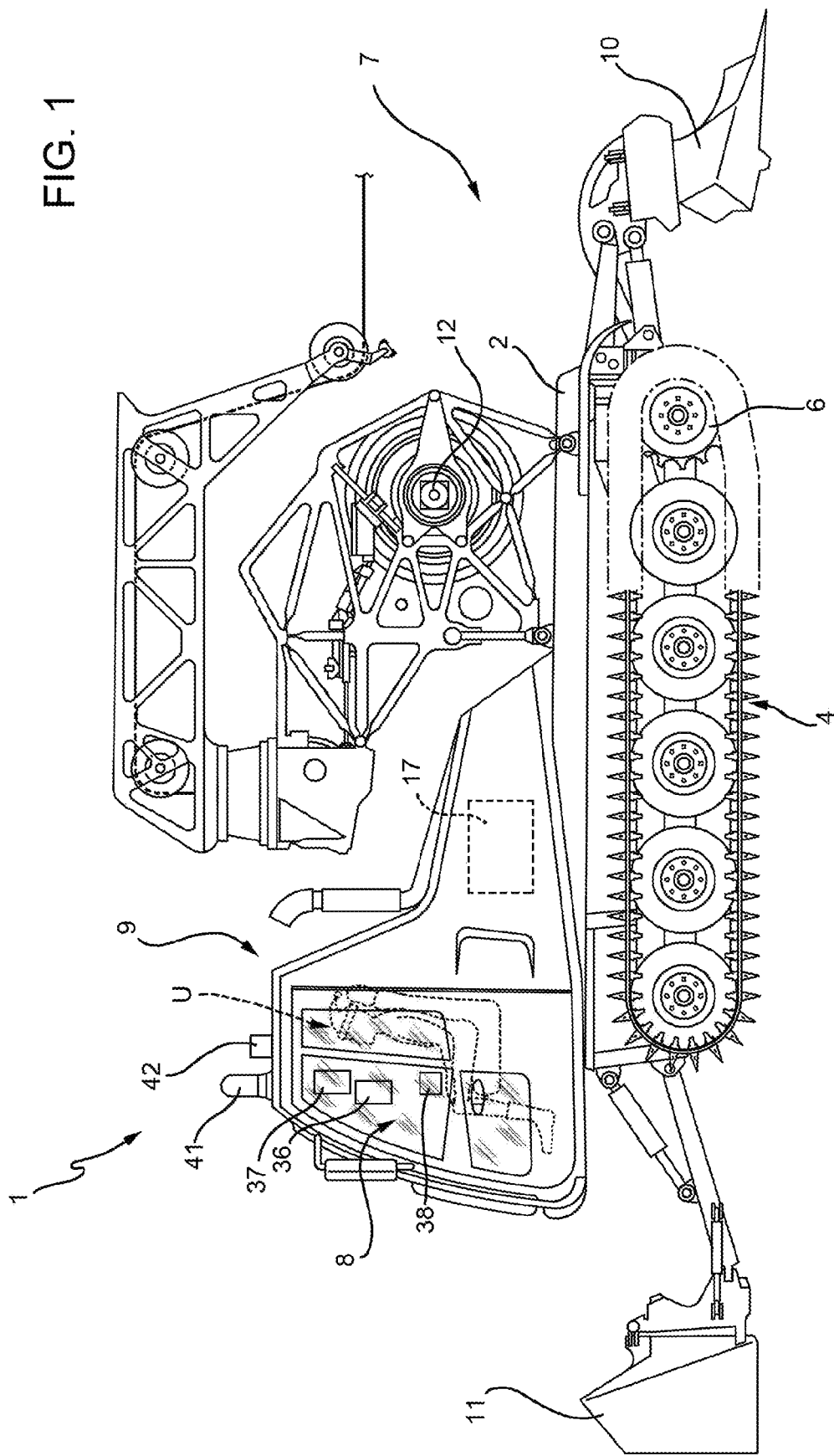
FIG. 1 is a side elevation view, with parts removed for clarity, of a tracked vehicle made in accordance with the present disclosure.
Figure 2:
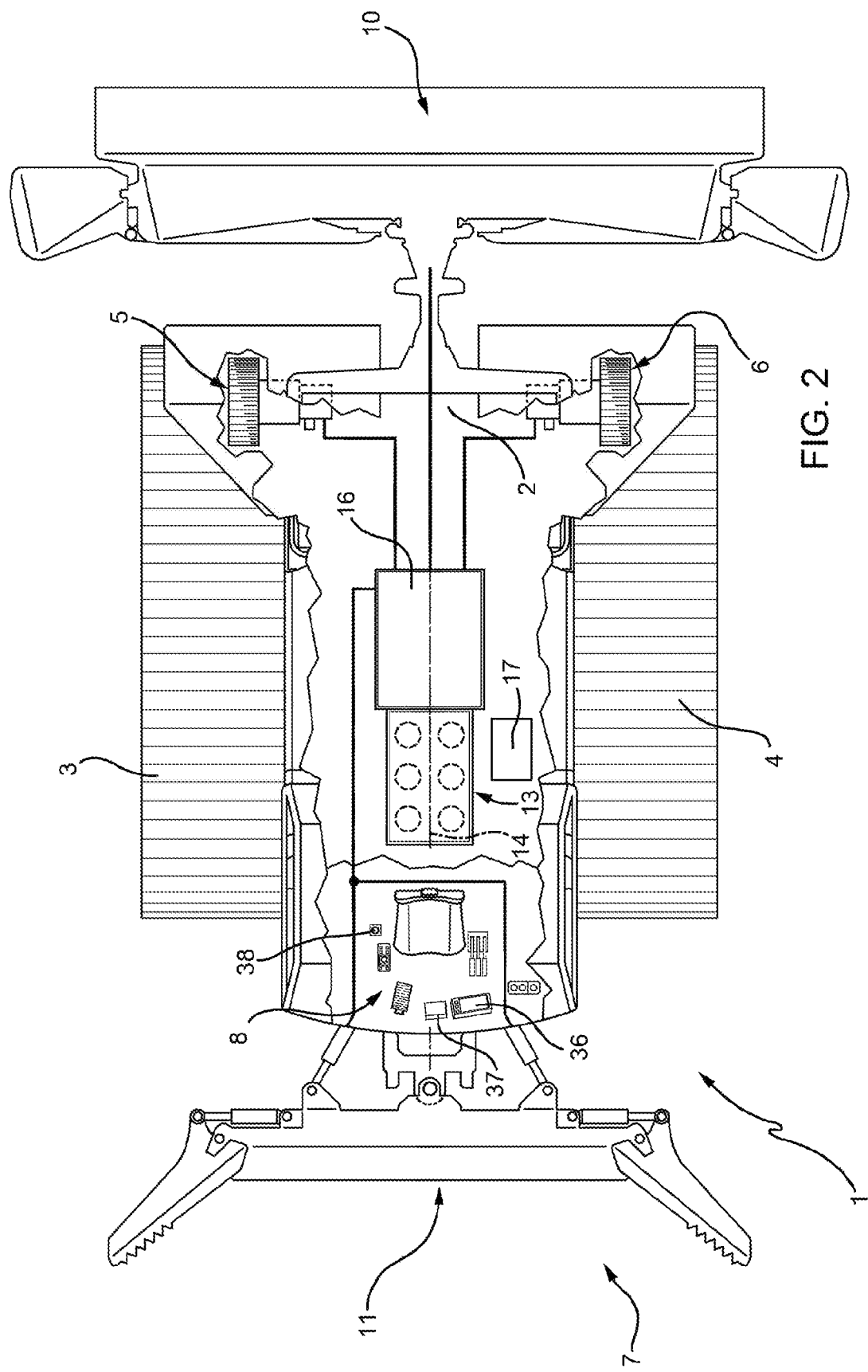
FIG. 2 is a top view, with parts removed for clarity, of the tracked vehicle in FIG. 1.
Figure 3:
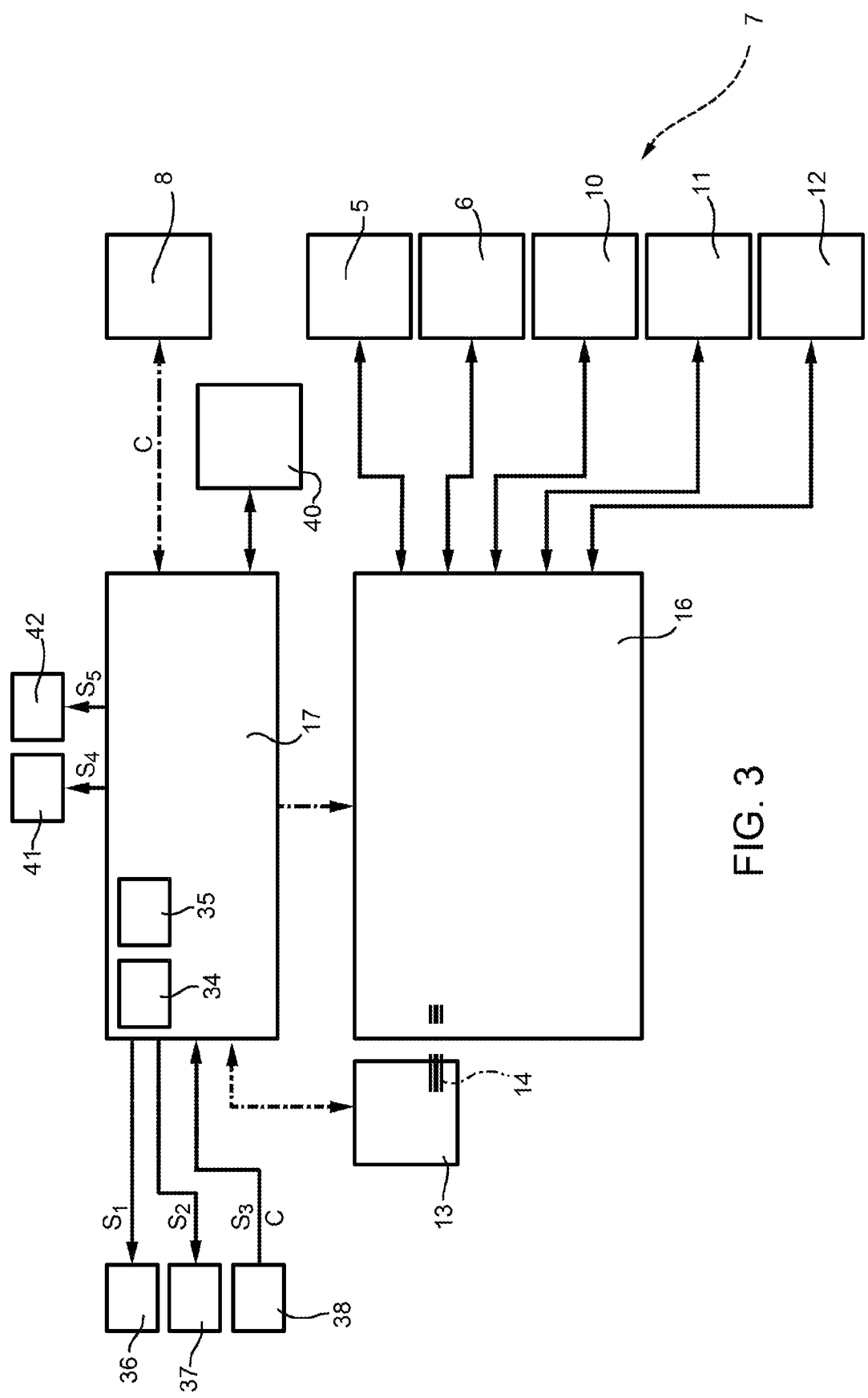
FIG. 3 is a block diagram of the tracked vehicle in FIG. 1.

Referring now to the example embodiments of the present disclosure illustrated in FIGS. 1 to 2 and specifically with reference to FIG. 1, reference numeral 1 indicates, as a whole, a tracked vehicle configured to groom ski runs. The tracked vehicle 1 comprises: a chassis 2; a first track 3 (FIG. 2); a second track 4; a first drive wheel 5 (FIG. 2) and a second drive wheel 6, which are mutually independent and coupled to the first track 3 (FIG. 2) and to the second track 4, respectively; a group of work devices 7; a control unit 17; a user interface 8 that can be operated by an operator U and is connected to the control unit 17 to send command from the operator U to the control unit 17; and a cab 9. In this case, and with reference to FIG. 2, the group of work devices 7 (FIG. 1) comprises a cutter 10, a shovel 11, and a winch 12 (FIG. 1).

The first drive wheel 5, the second drive wheel 6 and the work devices 7 define a power-consumption group.

Referring to FIG. 2, the tracked vehicle 1 comprises: a generator assembly 13 configured to generate mechanical power, which in the example shown is an internal combustion engine 13 with a (schematically shown) drive shaft 14; and a power transmission 16 operatively connected to the drive shaft 14 and configured to connect the internal combustion engine 13 to the group of work devices 7 (FIG. 1) and to the first drive wheel 5 and the second drive wheel 6. The control unit 17 is connected to the generator assembly 13 and to the power transmission 16 to control the generator assembly 13 and power transmission 16, respectively.

The generator assembly configured to generate mechanical power can comprise an electric motor, replacing the internal combustion engine combustion, or operating with and coupled to the internal combustion engine.

The power transmission 16 is a power transmission that comprises mechanical and/or hydraulic and/or electrical components. For example, the power transmission 16 may comprise a mechanical transmission, hydraulic pumps, hydraulic pipework, hydraulic actuators, mechanical gears, shafts, electric generators and electric motors.

In greater detail, and in a non-limitative embodiment of the present disclosure, the power transmission comprises: at least one electric generator mechanically coupled to the generator assembly configured to generate mechanical power; and at least one electric actuator, such as an electric motor, operatively coupled to one of the work devices and electrically connected to the electric generator.

In one non-limitative embodiment of the present disclosure, the power transmission comprises: at least one hydraulic pump mechanically coupled to the internal combustion engine; and at least one hydraulic actuator operatively coupled to one of the work devices and hydraulically connected to the hydraulic pump.

The control unit 17 is connected to the user interface 8 to receive commands C from the operator U.

The user interface 8 comprises one or more components from the following list: a pedal, for example an accelerator pedal; a control lever; one or more buttons; a joystick; and a steering wheel.

The control unit 17 is configured to measure an amount of time elapsed between a command C sent by the operator U and a subsequent command C sent by the operator U. In greater detail, the control unit 17 comprises a counter 34 that measures the amount of time elapsed since the last command C received from the operator U and resets on each new command C received from the operator U.

In addition, the tracked vehicle 1 comprises: an internal display element 36, for example a display or a flashing indicator; and an internal acoustic element 37, for example, a loudspeaker, a siren, a buzzer or a horn. The display element 36 and the acoustic element 37 are arranged inside the cab 9 and are configured to be respectively seen or heard by the operator U. The display element 36 and the acoustic element 37 are connected to the control unit 17 to receive signals from the control unit 17.

In addition, the tracked vehicle 1 comprises: an external display element 41, for example a flashing indicator; and an external acoustic element 42, for example, a loudspeaker, a siren, a buzzer or a horn. The display element 41 and the acoustic element 42 are arranged outside the cab 9 and are configured to be respectively seen or heard by persons outside the cab 9 to warn them of a potential hazard. The display element 41 and the acoustic element 42 are connected to the control unit 17 to receive signals from the control unit 17.

The control unit 17 constantly controls the value measured by the counter 34 and is configured to send a message to the operator U if the amount of time measured is greater than a warning time interval.

In greater detail, the control unit 17 sends a signal S1, corresponding to a visual message, to the display element 36 if the amount of time measured is greater than the warning time interval.

Furthermore, the control unit 17 sends a signal S2, corresponding to an acoustic message, to the acoustic element 37 if the amount of time measured is greater than the warning time interval.

The tracked vehicle 1 comprises a confirmation command unit 38 that can be operated by the operator U and is configured to send a command C, in particular a confirmation signal S3, to the control unit 17 so as to reset the amount of time measured. The confirmation command unit 38 is part of the user interface 8.

Furthermore, the control unit 17 constantly controls the value measured by the counter 34 and is configured to set the tracked vehicle 1 to a blocked state if the amount of time measured is greater than a first time interval threshold. To that end, the control unit 17 comprises a memory 35 in which the first time interval threshold and the warning time interval are stored.

In one version of this embodiment, the control unit 17 computes the first time interval threshold on the basis of a reference time interval stored in the memory 35 and on the basis of the speed of the tracked vehicle 1. To that end, the control unit 17 is connected to a speed gauge 40 and receives the speed measurement from the speed gauge.

The first time interval threshold corresponds to a time value greater than the warning time interval. In consequence, the control unit 17 sends the visual and acoustic message to the operator U before setting the tracked vehicle 1 in a blocked state.

In greater detail, the blocked state entails halting the movement of the first and second tracks 3 and 4, and the work devices 7. In other words, the control unit 17 is configured to halt the movement of the first and second tracks 3 and 4 if the amount of time measured is greater than the first time interval threshold. Furthermore, the control unit 17 is configured to halt the movement of the first and second tracks 3 and 4 in a gradual manner, in particular with the speed of the vehicle dropping according to a descending ramp.

In addition, the control unit 17 is configured to halt the movement of the work devices 7 if the amount of time measured is greater than the first time interval threshold. Furthermore, the control unit 17 is configured to halt the movement of the first and second tracks 3 and 4 in a gradual manner, in particular with the speed of the vehicle dropping according to a descending ramp.

Furthermore, the control unit 17 is configured to send a signal S4 to the display element 41 if the amount of time measured is greater than the first time interval threshold. The display element 41 emits a visual message to persons outside the cab 9 so as to warn them that the tracked vehicle 1 represents a potential hazard.

In addition, the control unit 17 is configured to send a signal S4 to the acoustic element 42 if the amount of time measured is greater than the first time interval threshold. The acoustic element 42 emits an acoustic message to persons outside the cab 9 so as to warn them that the tracked vehicle 1 represents a potential hazard.

It should be appreciated that in accordance with the present disclosure, the tracked vehicle 1 is automatically halted if the operator U is unable to control the tracked vehicle 1 correctly. In other words, the control unit 17 automatically detects if, for whatever reason, the operator U is in a situation of being unable to correctly control the tracked vehicle 1 and sets the latter in a blocked state so as to avoid injury to persons or damage to property.

It also evident that the present disclosure also covers embodiments not described in the detailed description and equivalent embodiments that fall within the scope of the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed is:

1. A tracked vehicle comprising:
   a first track;
   a second track;
   a generator assembly configured to generate mechanical power;
   a group of work devices coupled to the generator assembly;
   a first drive wheel coupled to the first track and to the generator assembly;
   a second drive wheel coupled to the second track and to the generator assembly;
   a user interface; and
   a control unit configured to:
     receive, via the user interface, a first command from an operator,
     measure an amount of time elapsed between the received first command and any second, subsequent command received, via the user interface, from the operator, and
     responsive to the measured amount of time being greater than a first time interval threshold, set a blocked state to cause a stopping of: (i) a movement of the first track caused by the generator assembly, (ii) a movement of the second track caused by the generator assembly, and (iii) a movement of the group of work devices caused by the generator assembly.

2. The tracked vehicle of claim 1, wherein the stopping of the movement of the first track and the second track comprises gradually reducing a speed of the first track and the second track according to a descending ramp.

3. The tracked vehicle of claim 1, further comprising at least one of: a display element and an acoustic element, wherein the display element is connected to the control unit and configured to send a visual message to the operator responsive to the measured amount of time being greater than a second time interval threshold which is lower than the first time interval threshold, and the acoustic element is connected to the control unit and configured to send an acoustic message to the operator responsive to the measured amount of time being greater than the second time interval threshold.

4. The tracked vehicle of claim 1, further comprising a confirmation command unit operable by the operator and configured to send a third command to the control unit to reset the measured amount of time.

5. The tracked vehicle of claim 1, wherein the first time interval threshold is determined based on a speed of the tracked vehicle.

6. The tracked vehicle of claim 1, wherein the control unit comprises a counter that measures the amount of time elapsed between the received first command and any second, subsequent command received, via the user interface, from the operator.

7. The tracked vehicle of claim 1, further comprising at least one of: a display element and an acoustic element, wherein the display element is connected to the control unit and configured to send a visual message to any persons within a designated vicinity of the tracked vehicle responsive to the measured amount of time being greater than the first time interval threshold, and the acoustic element is connected to the control unit and configured to send an acoustic message to the any persons within the designated vicinity of the tracked vehicle responsive to the measured amount of time being greater than the first time interval threshold.

8. A method of controlling a tracked vehicle comprising a first track, a second track, a generator assembly configured to generate mechanical power, a group of work devices coupled to the generator assembly, a first drive wheel coupled to the first track and to the generator assembly, a second drive wheel coupled to the second track and to the generator assembly, a user interface, and a control unit, the method comprising:
    measuring an amount of time elapsed between a first command received from an operator and any second, subsequent command received from the operator; and
    responsive to the measured amount of time being greater than a first time interval threshold, setting the tracked vehicle to a blocked state to cause a stopping of: (i) a movement of the first track caused by the generator assembly, (ii) a movement of the second track caused by the generator assembly, and (iii) a movement of the group of work devices caused by the generator assembly.

9. The method of claim 8, wherein stopping the movement of the first track and the second track comprises gradually reducing a speed of the tracked vehicle according to a descending ramp.

10. The method of claim 8, further comprising sending at least one of: a visual message and an acoustic message to the operator before setting the tracked vehicle to the blocked state.

11. The method of claim 8, further comprising resetting the amount of time measured responsive to receiving, from the operator and via the user interface, a reset command.

12. The method of claim 8, further comprising defining the first time interval threshold based on a speed of the tracked vehicle.

13. The method of claim 8, further comprising sending at least one of: a visual message and an acoustic message to any persons within a designated vicinity of the tracked vehicle when the tracked vehicle is in the blocked state.

* * * * *